(12) United States Patent
Liebers et al.

(10) Patent No.: US 9,408,446 B2
(45) Date of Patent: Aug. 9, 2016

(54) CASE FOR A PORTABLE ELECTRONIC DEVICE

(71) Applicant: Diversified Products, Inc., Collegeville, PA (US)

(72) Inventors: Steven B. Liebers, Collegeville, PA (US); Zhongqiu Zhu, Wenzhou (CN)

(73) Assignee: Diversified Products, Inc., Collegeville, PA (US)

( * ) Notice: Subject to any disclaimer, the term of this patent is extended or adjusted under 35 U.S.C. 154(b) by 0 days.

(21) Appl. No.: 14/326,048

(22) Filed: Jul. 8, 2014

(65) Prior Publication Data

US 2016/0007704 A1    Jan. 14, 2016

(51) Int. Cl.
| | | |
|---|---|---|
| A45C 11/00 | (2006.01) | |
| A45C 11/04 | (2006.01) | |
| H04B 1/3888 | (2015.01) | |
| A45F 5/02 | (2006.01) | |
| A45C 15/00 | (2006.01) | |

(52) U.S. Cl.
CPC .............. *A45C 11/00* (2013.01); *A45C 11/04* (2013.01); *H04B 1/3888* (2013.01); *A45C 15/00* (2013.01); *A45C 2011/002* (2013.01); *A45C 2200/15* (2013.01); *A45F 5/021* (2013.01)

(58) Field of Classification Search
CPC ........ A45C 11/00; A45C 11/04; A45C 15/00; A45C 2011/002; A45F 5/021; H04B 1/3888

USPC .................. 206/320, 504; 361/679.01, 679.3; 455/575.1, 575.8
See application file for complete search history.

(56) References Cited

U.S. PATENT DOCUMENTS

| | | | |
|---|---|---|---|
| D631,246 S | | 1/2011 | Boettner |
| 8,047,364 B2 * | | 11/2011 | Longinotti-Buitoni   A45C 11/00 206/320 |
| 8,504,127 B2 * | | 8/2013 | Altschul et al. ............ 455/575.8 |
| 2005/0016897 A1 * | | 1/2005 | Cho et al. ...................... 206/713 |
| 2005/0255898 A1 * | | 11/2005 | Huang ........................ 455/575.8 |
| 2011/0089078 A1 * | | 4/2011 | Ziemba ......................... 206/570 |
| 2011/0210018 A1 * | | 9/2011 | Friedman et al. ................. 206/5 |
| 2011/0294556 A1 * | | 12/2011 | Carlberg et al. ........... 455/575.8 |
| 2013/0105518 A1 * | | 5/2013 | Mcpherson et al. ..... 222/153.11 |
| 2013/0258269 A1 * | | 10/2013 | Shalon ............................ 351/79 |
| 2014/0228082 A1 * | | 8/2014 | Morrow et al. ............ 455/575.8 |

\* cited by examiner

*Primary Examiner* — Chun Cheung
(74) *Attorney, Agent, or Firm* — Caesar Rivise, PC

(57) ABSTRACT

A case for a portable electronic device is provided including a primary cover having an outer surface and an inner surface, the inner surface dimensioned to securely retain the portable electronic device. The case further includes a pouch to receive a pair of reading glasses on the outer surface of the primary cover. The pouch is secured to the outer surface by a receiver in the form of a pair of parallel tracks disposed on the outer surface of the primary cover that mates with a pair of corresponding rails disposed on the pouch.

7 Claims, 5 Drawing Sheets

CASE FOR A PORTABLE ELECTRONIC DEVICE

BACKGROUND OF THE INVENTION

The present invention is directed to protective cases for portable electronic devices, including phones, smart phones, personal digital, tablets and the like. More particularly, the present invention is directed to protective coverings for mobile electronic devices that are capable of holding and protecting other items as well as the mobile electronic device.

Every day, a very large number of people carry hand-held or otherwise portable electronic devices, such as a mobile phones, smart phones and tablets, (e.g., by Samsung, Inc., Blackberry, Ltd, or Apple, Inc.) or similar devices (hereinafter, generically "portable electronic devices"). When a user is out and about with one's portable electronic device, users must still often carry reading glasses in order for the users to clearly see the content displayed on the device. Moreover, since many or most of these electronic devices as well as reading glasses are somewhat fragile, many users desire to have protective coverings or cases to separately protect these electronic devices and reading glasses.

A number of different types of protective cases and coverings are available and are very well known for both portable electronic devices and for reading glasses. For portable electronic devices, many of these cases and coverings are molded from silicone rubber or plastic, some forming a soft covering or "skin" that hugs the contour of the device. Others are hard shell cases made from plastic.

Protective coverings for personal electronic devices are on the market that additionally incorporate a pocket for receiving items. For example, U.S. Pat. No. 8,047,364 (Longinotti-Buitoni) teaches a protective covering having various embodiments of pockets that are incorporated by various means, for example, gluing or sewing (see, e.g., FIGS. 2B and 3). See also U.S. Design Pat. No. D631,246 (Boettner). Other devices provide a combination phone and eyeglass case, but they are complex and expensive to manufacture. For example, U.S. Patent Pub. No. 2011/0210018 (Friedman et al.) discloses such a combination case. However, there is a need to provide a portable electronic device cover that protects the device as well as a pair of reading glasses that is easily and inexpensively manufactured and that adequately protects both reading glasses and the personal electronic device.

All references cited herein are incorporated herein by reference in their entireties.

BRIEF SUMMARY OF THE INVENTION

A case for a portable electronic device is provided. The case includes a primary cover having an outer surface and an inner surface. The inner surface is dimensioned to securely retain the portable electronic device. A pouch for receiving a pair of reading glasses is disposed on the outer surface of the primary cover. The pouch is secured to the outer surface by a receiver in the form of a pair of parallel tracks disposed on the outer surface of the primary cover that mates with a pair of corresponding rails disposed on the pouch.

The rails may slide into the tracks to secure the pouch to the primary cover. The tracks may have a T-shaped cross-sectional opening and the rails may have a mating T-shaped cross section. The pouch may have a lining of a soft fabric. A belt clip may be disposed on the case adjacent to the pouch. The pouch may be disposed parallel to an edge of the primary cover and away from the edge wherein the case is supported by the edge and the pouch to provide an easel support for the case and portable electronic device. Optionally, both the pouch and the primary cover may be manufactured from a polycarbonate thermoplastic polymer. The pouch and/or the primary cover may have, for example, an animal-skin or other indicia thereon.

BRIEF DESCRIPTION OF SEVERAL VIEWS OF THE DRAWINGS

The invention will be described in conjunction with the following drawings in which like reference numerals designate like elements and wherein.

DETAILED DESCRIPTION OF THE INVENTION

The invention will be illustrated in more detail with reference to the following embodiments, but it should be understood that the present invention is not deemed to be limited thereto.

Figure 1:
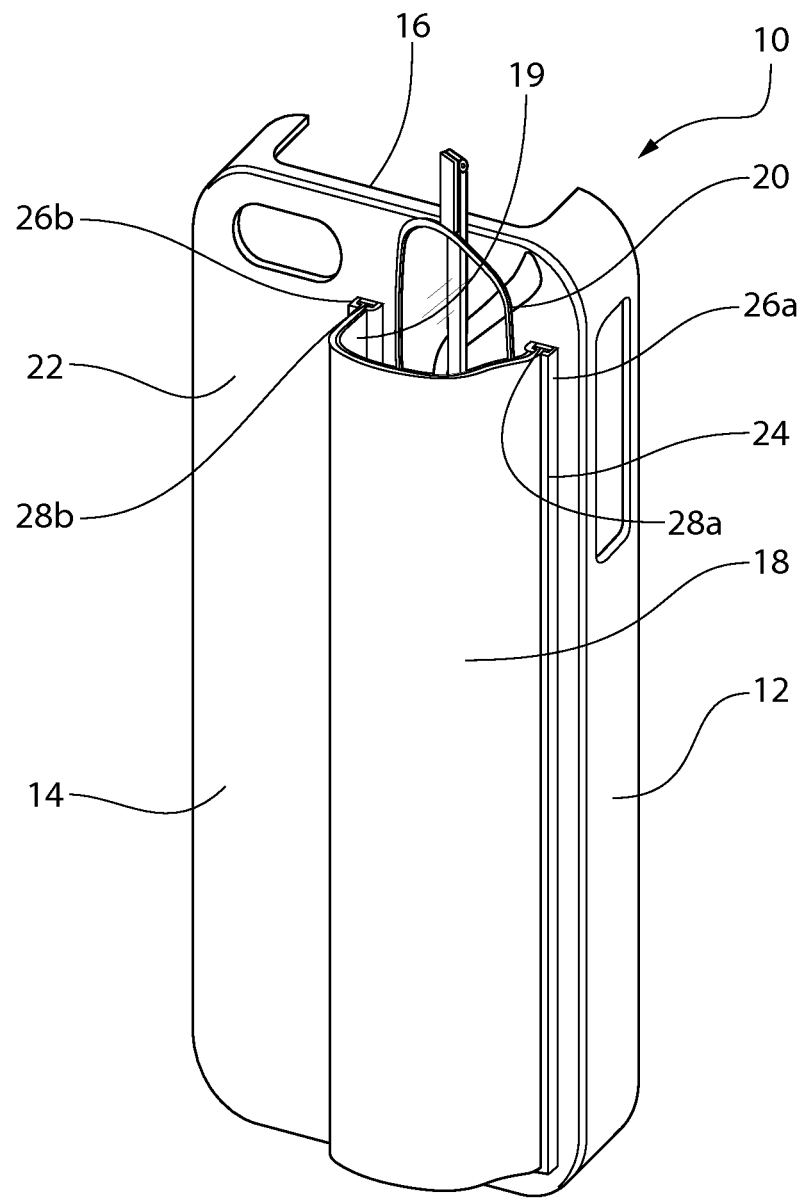
FIG. 1 is a rear isometric view of a case for a mobile phone in accordance with an exemplary embodiment of the present invention, the case having a pouch for holding reading glasses.
Figure 2A:
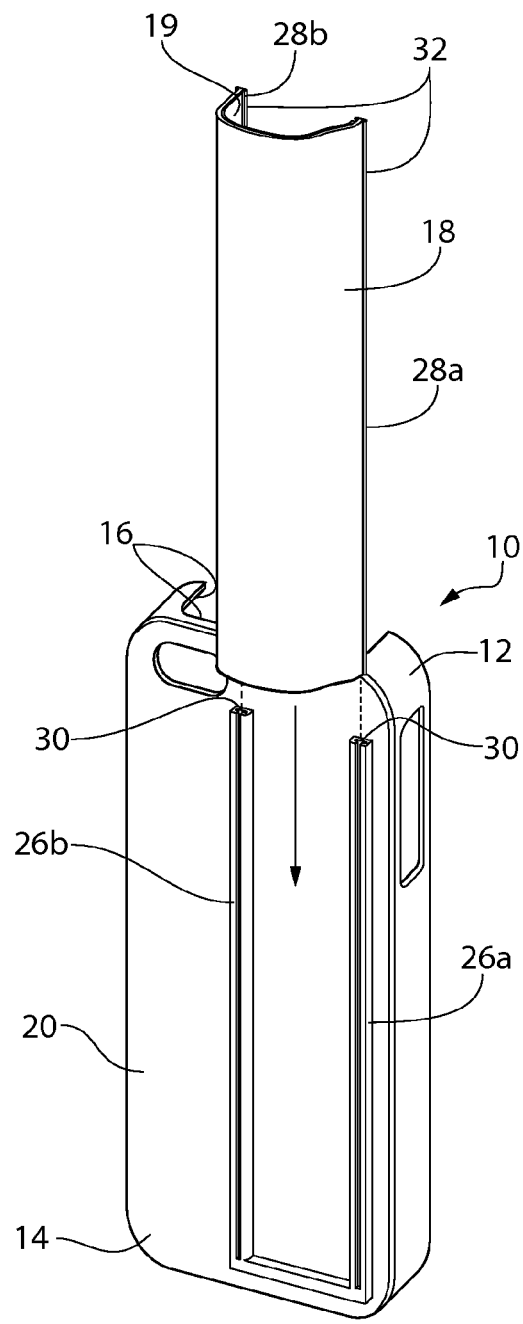
FIG. 2A is a rear isometric view of the case for a mobile phone of FIG. 1, showing a pouch for holding reading glasses prior to installation on the case.
Figure 2B:
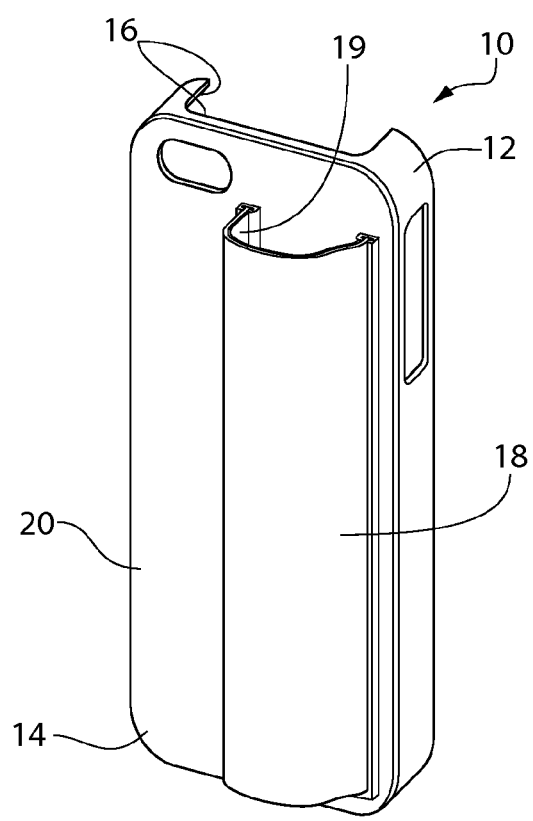
FIG. 2B is a rear isometric view of the case for a mobile phone of FIG. 1, showing the pouch for holding reading glasses installed on the case.

Referring now to the drawing figures, wherein like part numbers refer to like elements throughout the several views, there is shown in FIGS. 1, 2A, 2B a case for a portable electronic device 10 in accordance with an exemplary embodiment of the present invention. The portable electronic device 10 may be, for example, a mobile phone, smart phone (such as an iPhone®), personal digital assistant, electronic tablet (such as an iPad®), and the like. The case 10 includes a primary cover 12 having an outer surface 14 and an inner surface 16. The inner surface 16 is dimensioned to securely retain the portable electronic device 10 by various means well known in the art.

A pouch 18 to receive a pair of reading glasses 20 is disposed on the outer surface 14 (preferably the back surface 22) of the primary cover 12. The pouch 18 is secured to the outer surface 14 by a receiver 24, preferably in the form of a pair of parallel tracks 26a, 26b disposed on the outer surface 14 of the primary cover 12 that mates with a pair of corresponding rails 28a, 28b disposed on the pouch 18. In an exemplary embodiment, the pouch 18 is open where it mates with the outer surface 14 of the primary cover 12 such that the outer surface forms a wall of the pouch 18 for securing the reading glasses 20.

In the exemplary embodiment of the case 10, the parallel rails 28a, 28b of the pouch 18 are slid into the tracks 26a, 26b of the outer surface 14 of the primary cover 12 to secure the pouch 18 to the primary cover 12. The tracks 26a, 26b may have a T-shaped cross-sectional opening 30 that mate with a T-shaped cross section 32 of the rails 28a, 28b to securely hold the pouch 18 on the cover 12. Alternatively the rails 28a, 28b may have a T-shaped cross-sectional opening and the tracks 26a, 26b may have a T-shaped cross section.

In one exemplary embodiment, both the pouch 18 and the primary cover 12 are made from polycarbonate thermoplastic polymer. However, the pouch 18 may have a lining 19 of a soft fabric, such as velvet.

Figure 3:
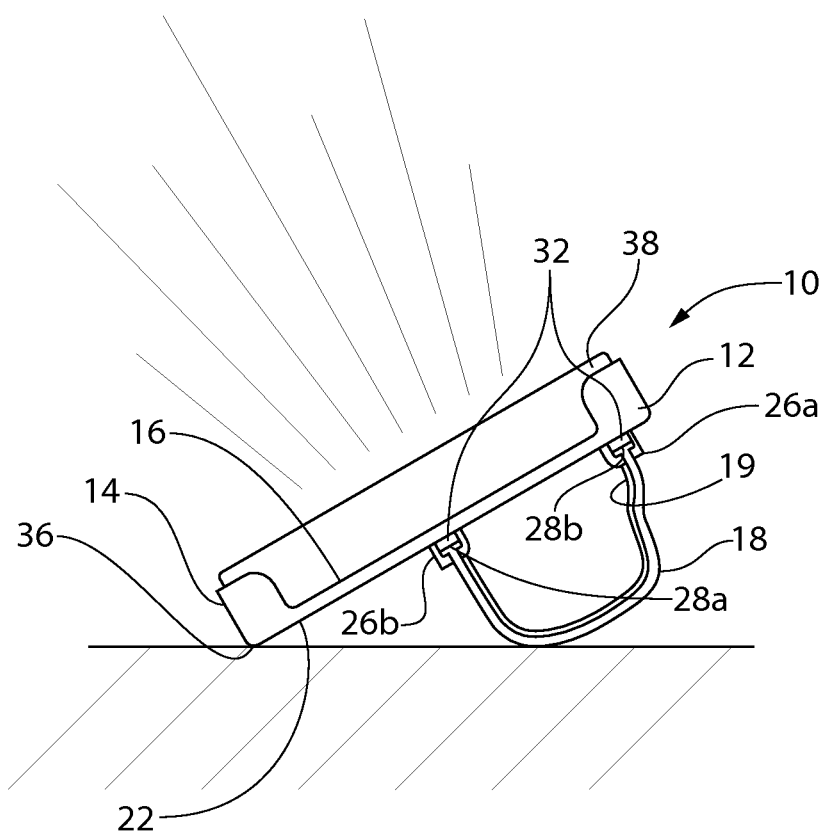
FIG. 3 is a side view of the case for a mobile phone of FIG. 1, shown in an easel position for viewing the display of the mobile phone in a landscape configuration.

As shown in FIG. 3, the pouch 18 may be disposed on the primary cover 12 parallel to an edge 36 of the primary cover 12 and away from the edge 12 such that the case 10 is supported by the edge 36 and the pouch 18 to provide an easel support for the case 10 and portable electronic device 38.

Figure 4:
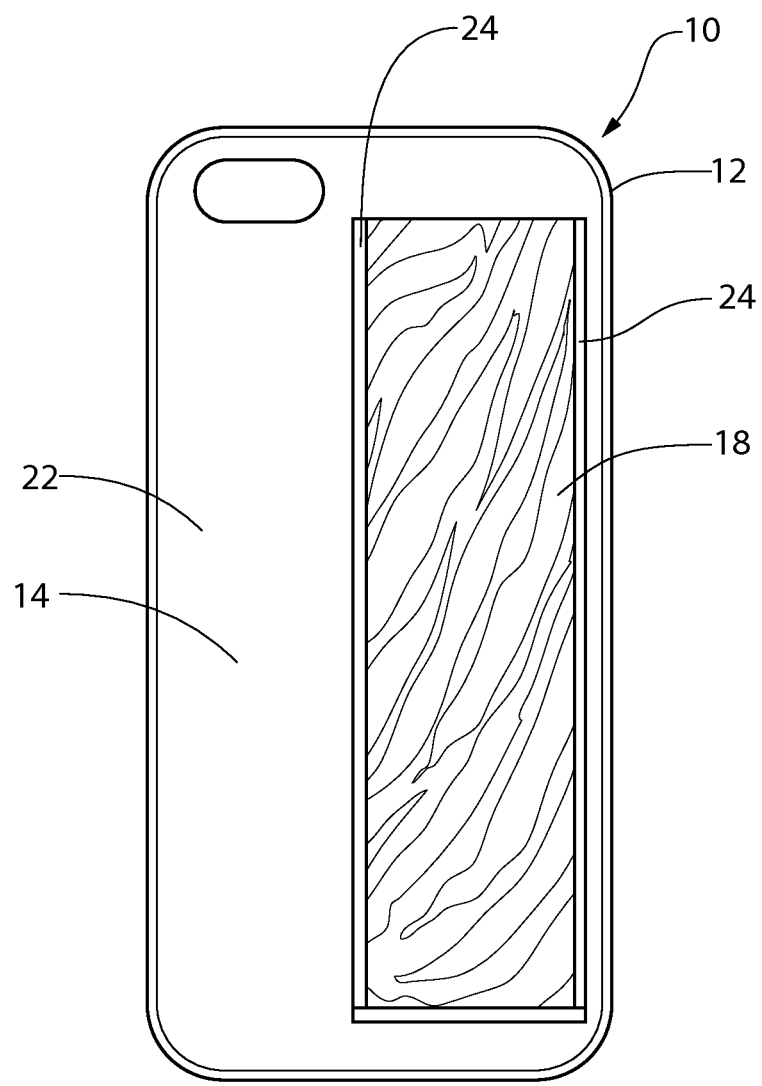
FIG. 4 is a rear view of the case for a mobile phone of FIG. 1, showing optional indicia on the pouch for holding reading glasses.

As shown in FIG. 4, the pouch 18 may have animal-skin (or other) indicia thereon. Likewise, the primary cover may have such indicia.

Figure 5:
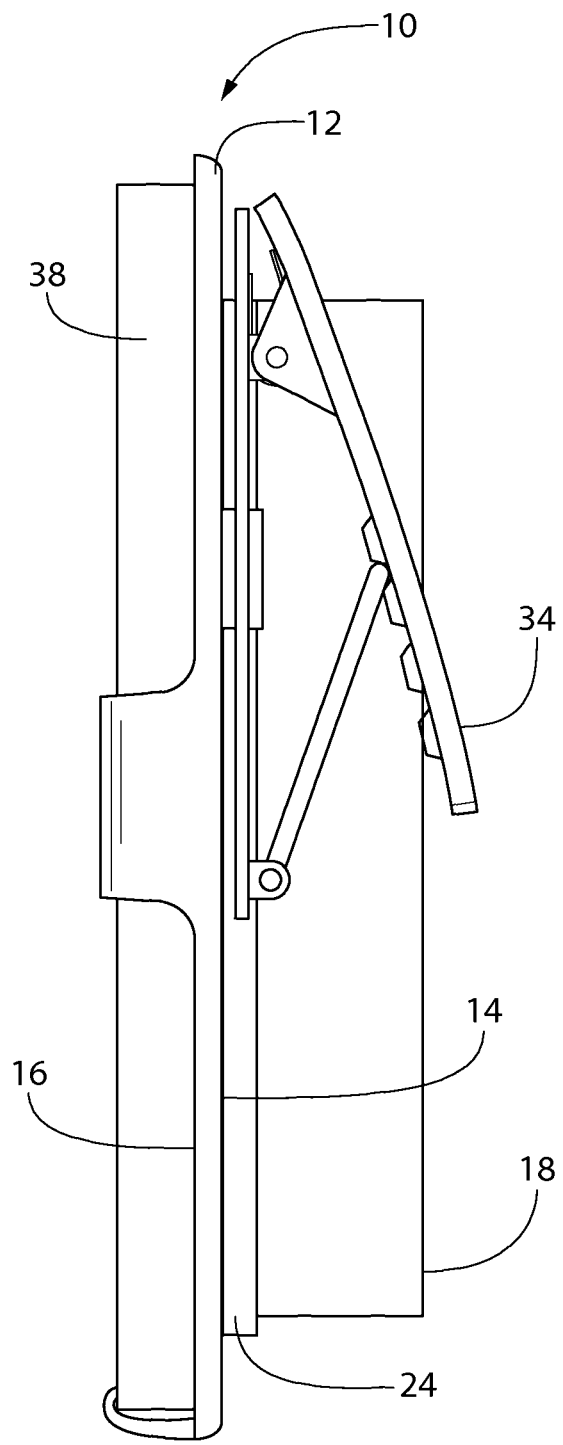
FIG. 5 is a side view of the case for a mobile phone of FIG. 1, showing an optional belt clip.

As shown in FIG. 5, a belt clip 34 may be disposed on the case 10 adjacent to the pouch 18, preferably on the back surface 22.

While the invention has been described in detail and with reference to specific embodiments, it will be apparent to one skilled in the art that various changes and modifications can be made therein without departing from the spirit and scope thereof.

What is claimed is:

1. A case for a portable electronic device, comprising:
   (a) a primary cover having an outer surface and an inner surface, the inner surface dimensioned to securely retain the portable electronic device; and
   (b) a pouch adopted to receive a pair of reading glasses on the outer surface of the primary cover, the pouch secured to the outer surface by a receiver in the form of a pair of parallel tracks disposed on the outer surface of the primary cover that mates with a pair of corresponding rails disposed on the pouch, wherein the pouch comprises a thin sheet having a first edge and a second edge, wherein a first rail of said pair of rails is disposed on said first edge and said second rail of said pair of rails is disposed on said second edge, wherein the first rail of the first edge is attached to a first track of the pair of parallel tracks independent of the second rail and second track and the second rail of the second edge of the thin sheet is attached to a second track of the pair of parallel tracks independent of the first rail and first track;
   wherein the tracks each have a T-shaped cross-sectional opening and the rails each have a mating T-shaped cross section.

2. The case for a portable electronic device of claim 1, wherein the rails slide into the tracks to secure the pouch to the primary cover.

3. The case for a portable electronic device of claim 1, wherein the pouch has a lining of a soft fabric.

4. The case for a portable electronic device of claim 1, including a belt clip disposed on the case adjacent to the pouch.

5. The case for a portable electronic device of claim 1, wherein the pouch is disposed parallel to an edge of the primary cover and away from the edge wherein the case is supported by the edge and the pouch to provide an easel support for the case and portable electronic device.

6. The case for a portable electronic device of claim 1, wherein both the pouch and the primary cover are polycarbonate thermoplastic polymer.

7. The case for a portable electronic device of claim 1, wherein the pouch has animal-skin indicia thereon.

* * * * *